(12) United States Patent
Mutz et al.

(10) Patent No.: US 10,698,074 B2
(45) Date of Patent: Jun. 30, 2020

(54) SYSTEM AND METHOD FOR LOCATING AN OBJECT

(71) Applicant: BLINKSIGHT, Colombelles (FR)

(72) Inventors: Matthieu Mutz, Caen (FR); Stéphane Mutz, Cuverville (FR)

(73) Assignee: Blinksight, Colombelles (FR)

( * ) Notice: Subject to any disclaimer, the term of this patent is extended or adjusted under 35 U.S.C. 154(b) by 610 days.

(21) Appl. No.: 15/109,518

(22) PCT Filed: Jan. 6, 2015

(86) PCT No.: PCT/EP2015/050105
§ 371 (c)(1),
(2) Date: Jul. 1, 2016

(87) PCT Pub. No.: WO2015/101674
PCT Pub. Date: Jul. 9, 2015

(65) Prior Publication Data
US 2016/0327630 A1    Nov. 10, 2016

(30) Foreign Application Priority Data

Jan. 6, 2014  (FR) .................................. 14 00017

(51) Int. Cl.
*G01S 5/10* (2006.01)
*G01S 5/02* (2010.01)
*G01S 5/06* (2006.01)

(52) U.S. Cl.
CPC .............. *G01S 5/0273* (2013.01); *G01S 5/10* (2013.01); *G01S 5/06* (2013.01)

(58) Field of Classification Search
CPC .................................................... G01S 5/0273
See application file for complete search history.

(56) References Cited

U.S. PATENT DOCUMENTS 4,636,795 A * 1/1987 Dano .................... G01S 5/0273
                                                            342/387
6,054,950 A * 4/2000 Fontana .................... G01S 5/06
                                                            342/463
(Continued)

FOREIGN PATENT DOCUMENTS

FR      2924818 A1     6/2009
GB      2378614 A  *   2/2003     ........... G01S 5/0273
(Continued)

OTHER PUBLICATIONS

Zhou et al. "Indoor Elliptical Localization Based on Asynchronous UWB Range Measurement." IEEE Trans. on Instrumentation and Measurement. vol. 60, Issue 1, Jan. 2011. pp. 248-257. (Year: 2011).*

(Continued)

*Primary Examiner* — Gregory C. Issing
(74) *Attorney, Agent, or Firm* — Sterne, Kessler, Goldstein & Fox P.L.L.C.

(57) ABSTRACT

The present invention relates to a system for locating a mobile element, characterized in that it comprises: at least one beacon emitting radio messages; at least one relay capable of emitting a second message with a known lag following the receipt of a first message originating from said at least one beacon; at least one sensor capable of measuring in a local time base the instants of arrival of the messages originating from said at least one beacon and at least one relay; at least one position computer, that can be central or onboard each sensor, capable of determining the position of a mobile element on the basis of the arrival time information; the mobile element being able to be a beacon, a relay or a sensor.

19 Claims, 6 Drawing Sheets

(56) References Cited

U.S. PATENT DOCUMENTS

| | | | |
|---|---|---|---|
| 6,515,623 B2* | 2/2003 | Johnson | G01S 5/12 342/387 |
| 6,590,537 B2* | 7/2003 | Bay | G01S 1/24 342/457 |
| 7,212,159 B2* | 5/2007 | Dooley | G01S 5/0215 342/453 |
| 7,738,836 B2 | 6/2010 | Alles et al. | |
| 8,849,300 B2* | 9/2014 | Zhou | G01S 5/06 455/456.1 |
| 2009/0061899 A1* | 3/2009 | Hwang | G01S 5/0018 455/456.2 |
| 2010/0008270 A1* | 1/2010 | Ahn | G01S 5/0289 370/310 |
| 2010/0177681 A1* | 7/2010 | Sahinoglu | G01S 5/12 370/328 |
| 2012/0208523 A1 | 8/2012 | Hans et al. | |
| 2013/0154836 A1* | 6/2013 | Derrico | G01S 5/0273 340/572.1 |
| 2014/0266907 A1* | 9/2014 | Taylor, Jr. | G01S 5/10 342/387 |

FOREIGN PATENT DOCUMENTS

| | | |
|---|---|---|
| WO | 9949333 A1 | 9/1999 |
| WO | 2010123291 A2 | 10/2010 |

OTHER PUBLICATIONS

Yan et al. "Research on UWB Indoor Positioning Based on TDOA Technique." 2009 9th International Conference on Electronic Measurement and Instruments. Aug 2009. (Year: 2009).*

International Search Report for Application No. PCT/EP2015/050105 dated Mar. 27, 2015.

French Preliminary Search Report for Application No. FR1400017 dated Nov. 27, 2014.

IEE, Part 15.4: Wireless Medium Access Control (MAC) and Physical Layer (PHY) Specification for Low-Rate Wireless Personal Area Networks (WPANs), Aug. 28, 2007, 203 pages.

* cited by examiner

SYSTEM AND METHOD FOR LOCATING AN OBJECT

CROSS REFERENCE TO RELATED APPLICATIONS

The present application is a national phase entry under 35 U.S.C. § 371 of International Application No. PCT/EP2015/050105, filed Jan. 6, 2015, published in French, which claims priority from French Patent Application No. 14/00017 filed Jan. 6, 2014, all of which are incorporated herein by reference.

GENERAL TECHNICAL FIELD

The context of this invention is that of locating a mobile object within an area covered by ad hoc infrastructure. The particular interest here is in applications needing the precise location of an object inside an enclosure or a covered building or an open-sky site delimited by an enclosure.

In fact, if the GPS or the mobile telephony networks of today easily know with relatively satisfactory precision the position of objects on the scale of the planet or an extended geographic area, the use of these technologies is not appropriate to location inside a building or on the scale of a delimited industrial site.

The focus here particularly is a solution which combines minimal bulk (size, weight), good location precision, and minimal power consumption.

PRIOR ART

Mobile telephony systems such as those known from documents US-A-2009/061899, US-A-2012/208523, WO 2010/123291 and U.S. Pat. No. 7,738,836 do perform location outside a building, but with precision of the order of 50 to 100 meters, insufficient for locating an object inside a building or an enclosure.

Document WO 99/49333 describes a system employing modulation with Ultra-WideBand radio-frequency pulse techniques.

The authors of WO 99/49333 present a solution for discovering the position of an object by means of measurements of flight time of a train of Ultra-WideBand radio pulses.

In a first implementation, the authors of WO 99/49333 describe a system using a receiver, known as active, linked to the object whereof the position is to be known, which responds to a request from an ultra-wideband pulse transmitter in turn by transmitting a series of pulses. The transmitter determines the existing distance between itself and the receiver by first measuring the time delay of the signal retransmitted by the receiver relative to the initially transmitted signal. The defect of this first implementation is needing a response from the receiver, therefore additional complexity of the latter. Use of the ultra-wideband radio channel is also prolonged.

The authors of WO 99/49333 also present a second implementation, called passive receiver, in which a single exchange is necessary and where the focus is on the time of receiving, by the receiver, a pulse train transmitted at a time known by the transmitter. As indicated by the authors this solution has the major drawback of needing the existence of a time base common to the transmitter and the receiver.

The description of the standard IEEE 802.15.4a, especially in annexes D1.3.1, D1.3.2 and D1.4, also has references to location systems. The latter employ distance-measuring techniques by estimation of the return flight time between two devices, such as presented in WO 99/49333, or multilateration TDOA by measuring the time difference of arrival of the same radio message at a plurality of receivers.

Direct flight time measuring systems such as presented in document WO 99/49333 or in annexes D1.3.1 and D1.3.2 of the standard IEEE 802.15.4a need the use of transceivers at each end of the link. The complexity and cost of the location function as well as the quantity of power consumed are therefore increased.

TDOA systems dispense with this restriction but pose the problem of fine synchronization of time bases of receivers for attaining satisfactory precision. For example, to obtain location measuring precision of 10 cm, the time bases of several receivers must be kept in phase with a precision of the order of 100 ps at all times. Such synchronization is in practice difficult to attain and needs for example the use of controlled distribution devices of a clock common to all the receivers of the TDOA system, for example in the form of a cabled network.

So as to propose a solution more adapted to this problem, a system and a method are required which are capable of locating an object inside an enclosure with a location precision of the order of 10 cm. Also, a system which minimizes the complexity of execution is sought, which minimize the number of necessary radio exchanges, which does not have the clock synchronization and/or distribution restrictions of TDOA systems and which is the most versatile possible.

PRESENTATION OF THE INVENTION

The present invention relates to a system for locating a mobile element characterized in that it comprises:
at least one beacon transmitting radio messages;
at least one relay capable of transmitting a second message with a known time lag following receipt of a first message coming from said at least one beacon;
at least one sensor capable of measuring in its own time base the times of arrival of messages coming from said at least one beacon and at least one relay;
at least one position computer, which can be central or onboard with each sensor, capable of determining the position of a mobile from time of arrival information;
the mobile element able to be a beacon, a relay or a sensor.

The invention measures the time difference of arrival between a direct path from a beacon to a sensor and one or more indirect paths involving retransmission with a known time lag by one or more relays.

Via its operating principle, this invention functions similarly to that of a TDOA system but needs no fine alignment of the time bases of several sensors since a single time base is used to take measurements of different times of arrival at the same sensor.

Relative to the systems for direct measurement of flight time, the present invention has reduced complexity of the beacon which needs use of one transmitter only, and of the target which needs use of one receiver only. For each of these two elements, the complexity is reduced, as is the necessary power expenditure.

Finally, the present invention enables considerable flexibility and is suitable both where the aim is to locate an object, for example determine the position of a pallet in a warehouse.

According to other advantageous and non-limiting characteristics of the invention:

the location system comprises a central sequencer having a radio transmitter and each beacon contains a radio receiver capable of receiving messages transmitted by said central sequencer.

the location system comprises several sensors all connected by a telecommunications means to a position computer.

the telecommunications means is for example of wired Ethernet type or WI-FI type and the position computer is a computer server.

According to a second aspect, the invention relates to a method for locating a mobile element characterized in that it comprises steps of:
(a) Transmitting, by at least one beacon, a message M1;
(b) Receiving said message M1 by at least one relay and transmitting a message M2 with a known time lag relative to receiving the message M1 by said at least one relay;
(c) Receiving said messages M1 and M2 by at least one sensor, and
(d) Determination of the position of a mobile carrying the beacon, the relay or the sensor, from time of arrival information.

According to other advantageous and non-limiting characteristics of the invention:

the message M1 transmitted in step (a) by a beacon comprises in its data the identification of the beacon.

the message M1 transmitted in step (a) comprises a time stamp for identifying the time of transmitting in the time base of the beacon and/or the time of receiving the message in the time base of the relay or of the sensor. This time stamp can for example be a packet start delimiter or a precise bit in a packet header.

the message M2 transmitted in step (b) by a relay comprises in its data the identification of the relay and that of the beacon whereof the message M1 has triggered the message M2 for this relay.

the message M2 transmitted in step (b) by a relay comprises a time stamp for identifying the time of transmitting in the time base of the relay and/or the time of receiving the message in the time base of the sensor. This tag can for example be a packet start delimiter or a precise bit in a packet header.

the time lag between receiving a message M1 transmitted in step (a) and transmitting a message M2 transmitted in step (b) by a relay is of the same order of magnitude as the processing time of messages M1 or M2.

The invention also relates to beacons, relays and sensors, as such, occurring in the execution of the system and/or method above.

PRESENTATION OF THE FIGURES

Other characteristics and advantages of the present invention will emerge from the following description of a preferred embodiment. This description will be given in reference to the appended drawings, in which.

DETAILED DESCRIPTION OF INVENTION

According to an embodiment of the invention, a system for locating a mobile element inside an enclosure is provided, characterized in that it comprises:

at least one beacon (1, 11, 12, 13) capable of transmitting at least one first radio message (M1, M11, M12, M13) inside the enclosure;

at least one relay (2, 21, 22) capable of transmitting a second message (M2, M21, M22) inside the enclosure with a known time lag (D) following receiving the first message (M1, M11, M12, M13) coming from said at least one beacon (1, 11, 12, 13);

at least one sensor (3) capable of measuring in a local time base the times of arrival of the messages coming from said at least one beacon (1, 11, 12, 13) and at least one relay (2, 21, 22) inside the enclosure;

at least one position computer (5), capable of determining the position of a mobile element, which is one of the beacon (1, 11, 12 ,13), the relay (2, 21, 22) and the sensor (3), from at least the positions and time of arrival information, known by the computer (5), of the others of the beacon (1, 11, 12, 13), the relay (2, 21, 22) and the sensor (3);

the beacon having at least one radio transmitter with Ultra-WideBand pulses for transmitting the first message (M1, M11, M12, M13), the relay having at least one radio receiver with Ultra-WideBand pulses for receiving the first message (M1, M11, M12, M13) and a radio transmitter with Ultra-WideBand pulses for transmitting the second message (M2, M21, M22), the sensor having at least one radio receiver of the type with Ultra-WideBand pulses for receiving the first message (M1, M11, M12, M13) and the second message (M2, M21, M22).

Based on the invention, a significant precision for measuring times inside an enclosure is obtained. This time precision can be of the order of 100 ps or fewer. So, the location precision of the mobile element inside an enclosure can be a few centimeters, for example 10 cm or fewer than 10 cm, or precision far better than mobile telephony systems producing location precision greater than 10 meters.

In fact, mobile telephony systems such as those known from documents above US-A-2009/061899, US-A-2012/208523, WO 2010/123291 and U.S. Pat. No. 7,738,836, present frames and sub-frames of a width of around 10 MHz.

By comparison, as per the embodiment indicated hereinabove the mode of communication involving a beacon, a relay and a sensor having transmitters and receivers with Ultra-WideBand pulses obtains at the same time bandwidth greater than or equal to 500 MHz, such that dimensional precision of location is less than or equal to 10 cm, for example greater than or equal to 3 cm and less than or equal to 10 cm.

Also, relative to systems of the prior art, the invention dispenses with the need for complicated clock synchronization for executing between several sensors or base stations. In this way, the invention needs fewer sensors and fewer base stations than the prior art, especially relative to those systems where the messages transmitted by a mobile transmitter must be received by two or three base stations which determine the location of the transmitter. Based on the invention the relay has no need of substantial clock precision. For example, if the time lag D is equal to 1 ms, clock precision of 0.1 ppm of the relay introduces fewer than 100 ps measuring error.

The enclosure can be a closed or delimited or fenced enclosure.

The enclosure can be a building, for example a covered building, or a building delimited by walls and a roof. The enclosure can be a warehouse or a shop. The enclosure can be an open-sky site, delimited horizontally by a physical limit. The enclosure can be an external installation on a delimited geographic area, such as for example a stadium, a station, an airport, a metro station or a underground transport station or an underground site. The enclosure can be an industrial site or a factory.

According to the invention, the mobile element is one of the beacon, the relay and the sensor.

According to an embodiment of the invention, the mobile element is the beacon or an object carrying the beacon.

According to an embodiment of the invention, the mobile element is the relay or an object carrying the relay.

According to an embodiment of the invention, the mobile element is the sensor or an object carrying the sensor.

According to an embodiment of the invention, the system for locating a mobile element inside an enclosure comprises a central sequencer (4) having a radio transmitter and each beacon (1, 11, 12, 13) contains a radio receiver adapted for receiving messages transmitted by said central sequencer.

According to an embodiment of the invention, the system for locating a mobile element inside an enclosure comprises several sensors (3) all connected by a telecommunications means to the remote position computer.

According to an embodiment of the invention, the telecommunications means is of wired Ethernet type or WI-FI type and the position computer is a computer server.

According to an embodiment of the invention, the computer (5) can be central and remote from each sensor.

According to an embodiment of the invention, the computer (5) is onboard the sensor.

According to an embodiment of the invention, said time lag (D) is known by the position computer (5), which is capable of determining the position of the mobile element from at least said time lag (D).

According to an embodiment of the invention, a method for locating a mobile element inside an enclosure is provided, characterized in that it comprises steps of:

(a) Transmitting, by at least one beacon (1, 11, 12, 13) at least one first message (M1, M11, M12, M13) inside the enclosure;

(b) Receiving said first message (M1, M11, M12, M13) by at least one relay (2, 21, 22) inside the enclosure and transmitting, inside the enclosure, a second message (M2, M21, M22) with a known time lag (D) relative to receiving the first message (M1, M11, M12, M13) by said at least one relay (2, 21, 22);

(c) Receiving, inside the enclosure, said messages (M1, M11, M12, M13, M2, M21, M22) by at least one sensor (3) and measuring, in a local time base, the times of arrival of the messages coming from said at least one beacon (1, 11, 12, 13) and at least one relay (2, 21, 22) inside the enclosure;

(d) Determination, by a position computer (5) of the position of the mobile element carrying the beacon, the relay or the sensor, from at least the positions and time of arrival information, known by the computer (5), of the others of the beacon (1, 11, 12, 13), the relay (2, 21, 22) and the sensor (3), the beacon having at least one radio transmitter with Ultra-WideBand pulses for transmitting the first message (M1, M11, M12, M13), the relay having at least one radio receiver with Ultra-WideBand pulses for receiving the first message (M1, M11, M12, M13) and a radio transmitter with Ultra-WideBand pulses for transmitting the second message (M2, M21, M22), the sensor having at least one radio receiver of the type with Ultra-WideBand pulses for receiving the first message (M1, M11, M12, M13) and the second message (M2, M21, M22).

According to an embodiment of the invention, the first message (M1, M11, M12, M13) transmitted in step (a) comprises a time stamp for identifying the time of transmitting in the time base of the beacon and/or the time of receiving the first message (M1, M11, M12, M13) in the time base of the relay or of the sensor.

According to an embodiment of the invention, the second message (M2, M21, M22) transmitted in step (b) comprises a time stamp for identifying the time of transmitting the second message (M2, M21, M22) in the time base of the relay and/or the time of receiving the second message (M2, M21, M22) in the time base of the sensor and/or the time lag between the time of receiving the first message (M1, M11, M12, M13) and the time of transmitting the second message (M2, M21, M22) in the own time base of the relay.

According to an embodiment of the invention, the time stamp present in the messages (M1, M11, M12, M13) transmitted in step (a) and/or the time stamp present in the messages (M2, M21, M22) transmitted in step (b) is a particular field of the message. For example, it can be a field delimiting the end of a synchronization header or a precise bit of a packet header.

According to an embodiment of the invention, the first message (M1, M11, M12, M13) transmitted in step (a) by the beacon comprises in its data the identification of the beacon.

According to an embodiment of the invention, the second message (M2, M21, M22) transmitted in step (b) by the relay comprises in its data the identification of the relay and that of the beacon having triggered the retransmission.

According to an embodiment of the invention, the time lag (D) between receiving the first message (M1, M11, M12, M13) transmitted in step (a) and transmitting the second message (M2, M21, M22) transmitted in step (b) by the relay is at least equal to the processing time of the first and/or second message, and as far as possible of the same order of magnitude as the processing time of the first and/or second message.

According to an embodiment of the invention, said time lag (D) is known by the position computer (5), which is capable of determining the position of the mobile element from at least said time lag (D). For example, the time lag (D) is programmed in the computer (5) or determined during an initial calibration phase.

According to an embodiment of the invention, a beacon for transmitting a radio message for executing the system such as described hereinabove and/or of the method such as described hereinabove is provided, characterized in that the beacon comprises at least one radio transmitter with Ultra-WideBand pulses (100) for periodically transmitting a message (M1, M11, M12, M13) comprising a time stamp for identifying the time of transmitting in a time base of the beacon.

According to an embodiment of the invention, a relay for receiving and transmitting a radio message for executing the system such as described hereinabove and/or of the method such as described hereinabove is provided, characterized in that it comprises:

at least one radio receiver with Ultra-WideBand pulses (200) for receiving a first message (M1, M11, M12, M13) coming from a beacon and comprising a time stamp for precisely identifying the time of receiving the message (M1, M11, M12, M13) by said radio receiver with Ultra-WideBand pulses, at least one radio transmitter with Ultra-WideBand pulses (100) for transmitting the second message (M2, M21, M22) comprising in its data the first message (M1, M11, M12, M13) and comprising a time stamp for identifying the time of transmitting the second message (M2, M21, M22) in a time base of the relay, the time lag between receiving the first message (M1, M11, M12, M13) and transmitting the second message (M2, M21, M22) being known for sure in a time base of the relay.

According to an embodiment of the invention, a sensor for receiving a radio message for executing the system such as described hereinabove and/or of the method such as described hereinabove is provided, characterized in that it comprises:

at least one radio receiver of the type with Ultra-WideBand pulses (200) for receiving a first message (M1, M11, M12, M13) transmitted from a beacon and a second message (M2, M21, M22) transmitted from a relay, and a unit for measuring in a local time base on the sensor the times of arrival of the first message (M1, M11, M12, M13) coming from the beacon and/or the second message (M2, M21, M22) coming from the relay.

Figure 1:
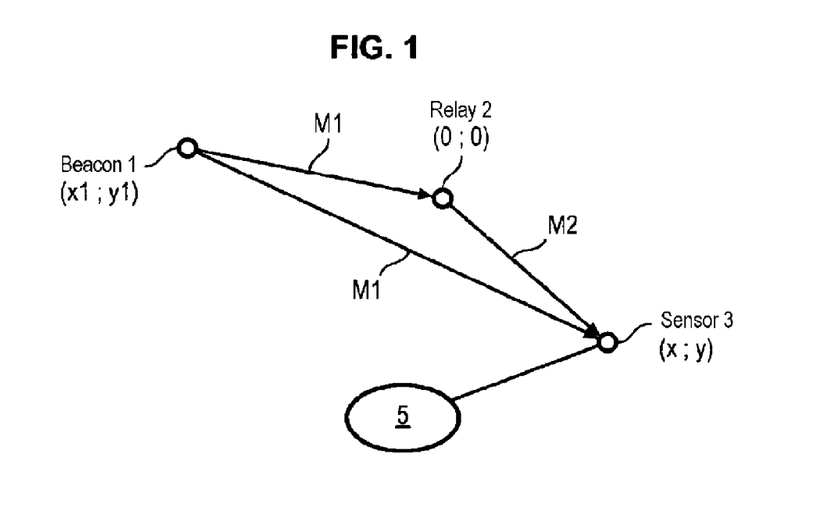
FIG. 1 is a drawing of a first embodiment of the invention having a fixed beacon, a fixed relay and a mobile sensor.
Figure 2:
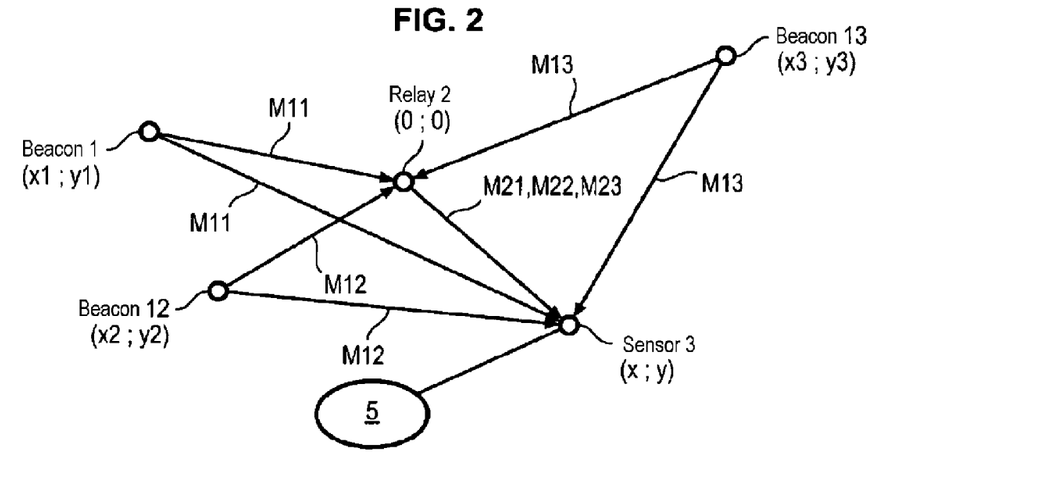
FIG. 2 is a drawing of a second embodiment of the invention having several fixed beacons, a fixed relay and a mobile sensor.

As shown in FIGS. 1 and 2, the invention comprises one or more beacons 1, 11, 12 or 13. Each beacon 1, 11, 12 or 13 comprises at least one radio transmitter with Ultra-WideBand pulses capable of transmitting a first message M1, M11, M12 or M13.

The invention further comprises one or more relays 2, 21 or 22. Each relay comprises at least one radio receiver with Ultra-WideBand pulses, a radio transmitter with Ultra-WideBand pulses and a device for triggering transmitting of a second radio message M2, M21 or M22 with a predetermined time lag D relative to the time of receiving the first message M1, M11, M12 or M13 by the receiver.

The invention comprises at least one sensor 3 which captures the first message M1, M11, M12 or M13 and the second message M2, M21 or M22. Each sensor 3 is equipped with at least one radio receiver with Ultra-WideBand pulses, a local time base and a device for measuring, according to the local time base, the times of arrival of the messages M1, M11, M12, M13 and/or M2, M21, M22.

Finally, the invention further comprises one or more position calculation devices 5, shown in FIGS. 1 and 2. From data contained in the messages M1, M11, M12 or M13 and M2, M21 or M22, measured times of arrival and supposedly known data on the position of beacons and/or the relay and/or the sensors, a computer provides an estimation of the position of the mobile to be tracked, with said mobile maybe a beacon, a relay or else a sensor.

Figure 3:
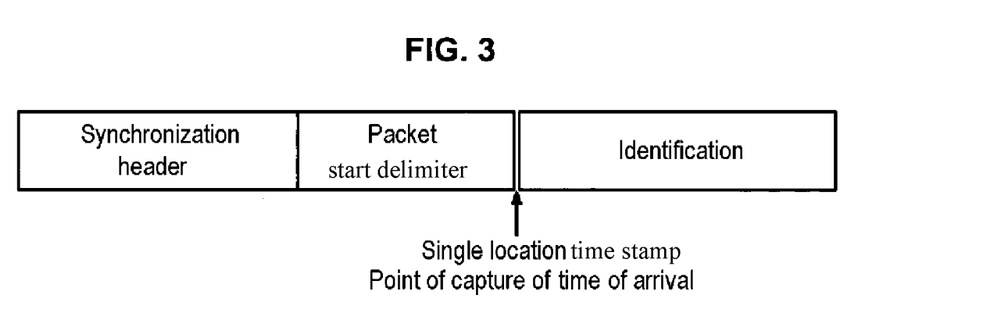
FIG. 3 is a drawing of a message transmitted by a beacon according to an embodiment of the invention.

Each beacon 1, 11, 12 or 13 transmits by means of its radio transmitter a first radio message M1, M11, M12 or M13, shown in FIG. 3, comprising inter alia a time stamp allowing an adapted receiver to determine with precision the time of receiving said time stamp in the message M1, M11, M12 or M13 in a local time base at the receiver during its receipt. The message M1, M11, M12 or M13 can further contain for example a data area containing an identifier for uniquely determining the identity of the beacon 1, 11, 12 or 13 having transmitted the message M1, M11, M12 or M13.

In the following, "measuring the time of arrival of the radio message" will designate the operation which consists of measuring, in a local time base on the relevant device, the precise time of receiving the time stamp contained in the received radio message.

Figure 4:
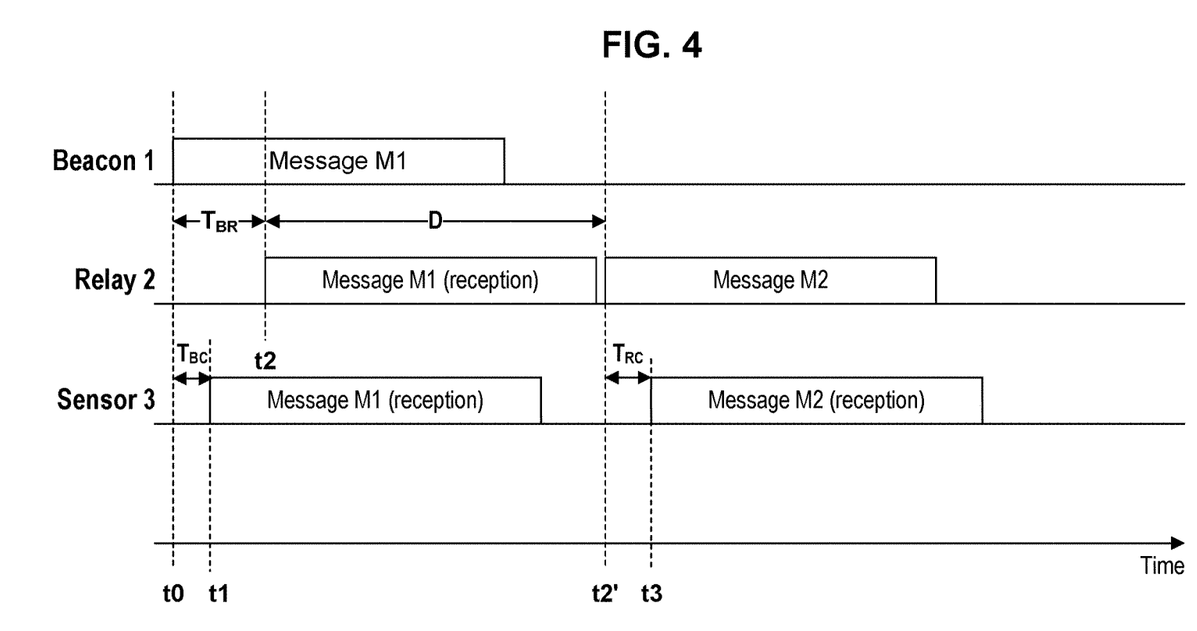
FIG. 4 is a transmission and receipt diagram of messages performed by a location system according to the first embodiment of the invention.

In the embodiment shown in FIG. 4, the message M1 transmitted by a beacon 1 at a time t0 is supposed.

The message M1 is received by a sensor 3 with a delay $T_{BC}$ linked to the flight time of radio waves between the beacon 1 and the sensor 3. The sensor measures the time t1 of arrival of this message M1 in its own time base.

Figure 5:
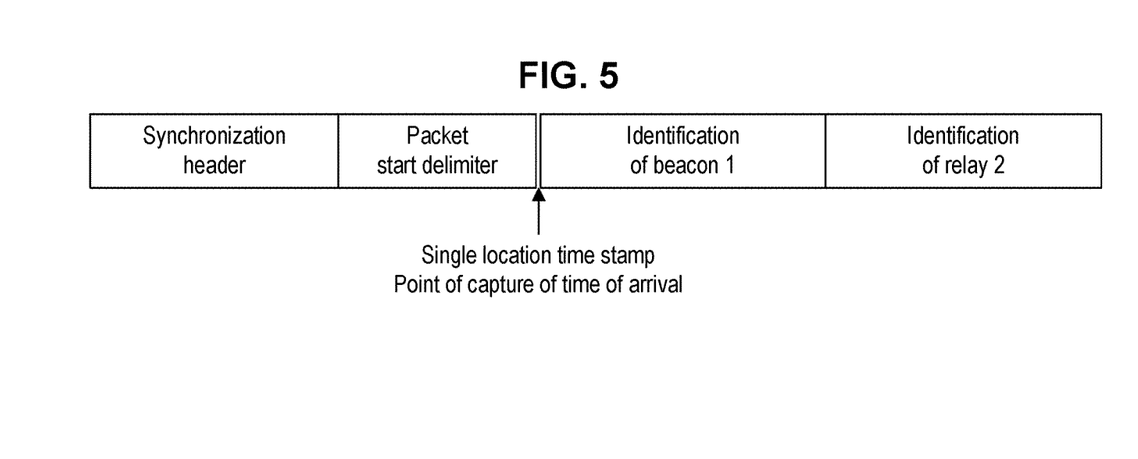
FIG. 5 is a drawing of a message transmitted by a relay according to an embodiment of the invention.

Quasi-simultaneously, the message M1 transmitted by the beacon 1 is also received by a relay 2 with a delay $T_{BR}$ linked to the flight time of radio waves from the beacon 1 to the relay 2. The message M1 is received by the relay 2 at the time t2. This receipt will then trigger transmitting by the relay 2 of a second message M2 after a known time lag D relative to the time t2 of receiving the message M1 by the relay 2. The message M2 comprises inter alia a time stamp for determining precisely the time of receiving by a receiver. It can also comprise a data area containing for example a first identifier for uniquely determining the identity of the beacon 1 having transmitted the first message M1 at the origin of this second message M2, and/or a second identifier for uniquely determining the identity of the relay 2, as shown in FIG. 5.

In particular embodiments of the invention, the message M2 can further comprise information characterizing the time t2 of receiving the message M1 in the time base specific to the relay 2 and/or information characterizing the time lag D.

The time lag D is therefore specified so that the time stamp present in the message M2 transmitted by the radio transmitter of the relay 2 is transmitted exactly with a time lag D relative to receipt by the radio receiver of the relay 2 of the time stamp present in the message M1. The time lag D is expressed relative to the local time base of the relay.

The message M2 is received by the sensor 3 with a delay $T_{RC}$ linked to the flight time of radio waves from the relay 2 to the sensor 3. The latter determines the time t3 of receiving by its radio receiver in its own time base.

If any frequency offset of time bases of the relay 2 and the sensor 3 is omitted, the following equation results:

$$t3-t1=T_{BR}+D+T_{RC}-T_{BC}$$

The time lag D is selected such that it is greater than the maximum flight time of the radio waves from the beacon 1 to the sensor 3 or the beacon 1 to the relay 2.

The time lag D is for example of the same order of magnitude as the duration of reading, writing and transmitting of messages M1 and M2.

In a particular embodiment of the invention given here by way of example in FIG. 4, the duration of the first message M1 is for example 0.6 ms, that of the second message M2 is 1 ms and the duration D is also 1 ms. In this same embodiment, the maximal scope attainable by a radio communication is 60 meters and the maximum measurable flight time is 200 ns.

The contribution of the relay 2 to the measuring error of time difference of arrival t3–t1 occurs essentially in the time lag D. It is not necessary for the time base of the relay 2 to be perfectly in phase at each time with that of the beacon 1 or of the sensor 3. A precision of 100 ps on a time lag D of 1 ms can be obtained relatively easily, which limits the relative contribution of the relay 2 to a position error of 3 cm.

Following receiving of a first message M1 and a second message M2, for each first message M1 followed by a second message M2, a sensor 3 forms a pair (t1; t3) describing the respective times of arrival of the first message M1 and of the second message M2 in its local time base. If needed, these pairs can be increased to include the identity of the beacon 1 and/or that of the relay 2, for example in the form of a quadruplet (1; 2; t1; t3).

Also, if the message M2 contains the information t2 characterizing the time of receiving the message M1 by the relay 2 according to its own time base, this information t2 could also be preserved by the sensor 3, for example in the form of triplets (t1; t2; t3) or quintuplets (1; 2; t1; t2; t3).

This information, for example the pairs (t1; t3), the triplets (t1; t2; t3), the quadruplets (1; 2; t1; t3) or the quintuplets (1; 2; t1; t2; t3), is transmitted to a position calculation unit 5. The position calculation unit 5 uses inter alia the times t1 and t3, the knowledge of the time lag D, as well as supposed parameters known from the system for estimating the position of a mobile. For example, if the position of the beacons 1, 11, 12, 13 and relays 2, 21, 22 is known from the system, the position computer will use the knowledge of the respective positions of the beacons 1, 11, 12, 13 and relays 2, 21, 22 to determine the location of the sensors 3, this case corresponding to the embodiment where the mobile element is the sensor or an object carrying the sensor. Calculations made in the position calculation unit 5 are similar to those made in a unit similar to a system of TDOA type.

If several relays 2 are within reach of a same beacon 1, they can each transmit a message M2 consecutively on receiving of the message M1. In the event where the sensor 3 itself is within reach of receiving of this plurality of relays 2, it will receive multiple messages M2 and will capture a plurality of times of arrival t3. It will consequently transmit a plurality of information, for example quintuplets (1; 2; t1; t2; t3), to the position computer 5, the identity of the relays 2 and the times t2 and t3 being different for each such quintuplet.

For simple implementation, a radio receiver with Ultra-WideBand pulses such as that integrated into the relay 2 or the sensor 3 is generally capable of receiving a single radio message at the same time. It is important for optimal operation of the invention to guarantee proper sequencing of operations.

In the event where in the same system there are several beacons 1, 11, 12 or 13 within communication reach of a same relay 2 or a same sensor 3, it is suggested to ensure that the messages M1 transmitted by each beacon 1, 11, 12 or 13 do not collide with each other.

For example, a time division multiple access (TDMA) process can be put in place.

Figure 6:
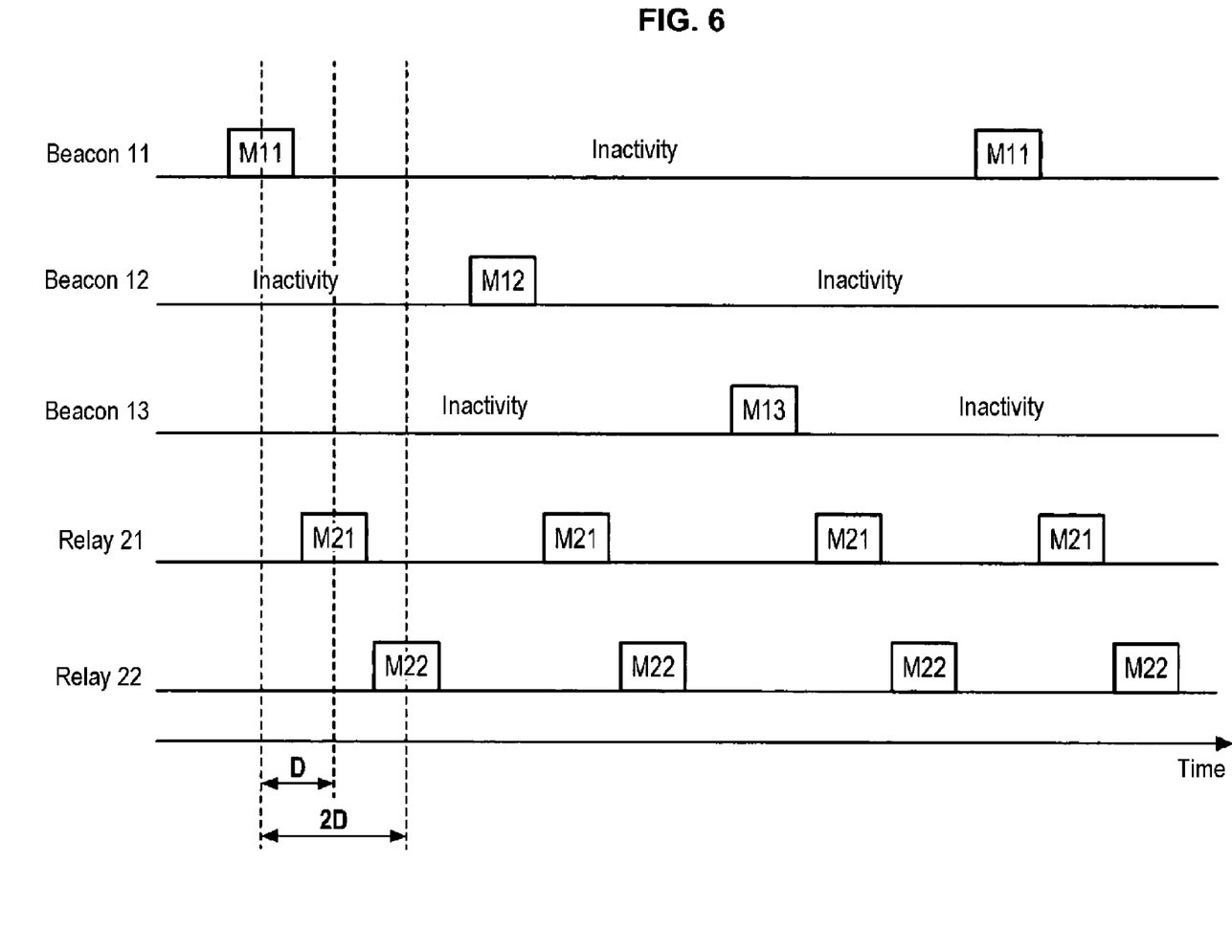
FIG. 6 is a transmission and receipt diagram of messages according to an embodiment of the invention for avoiding collisions between messages from beacons and relay.
Figure 7:
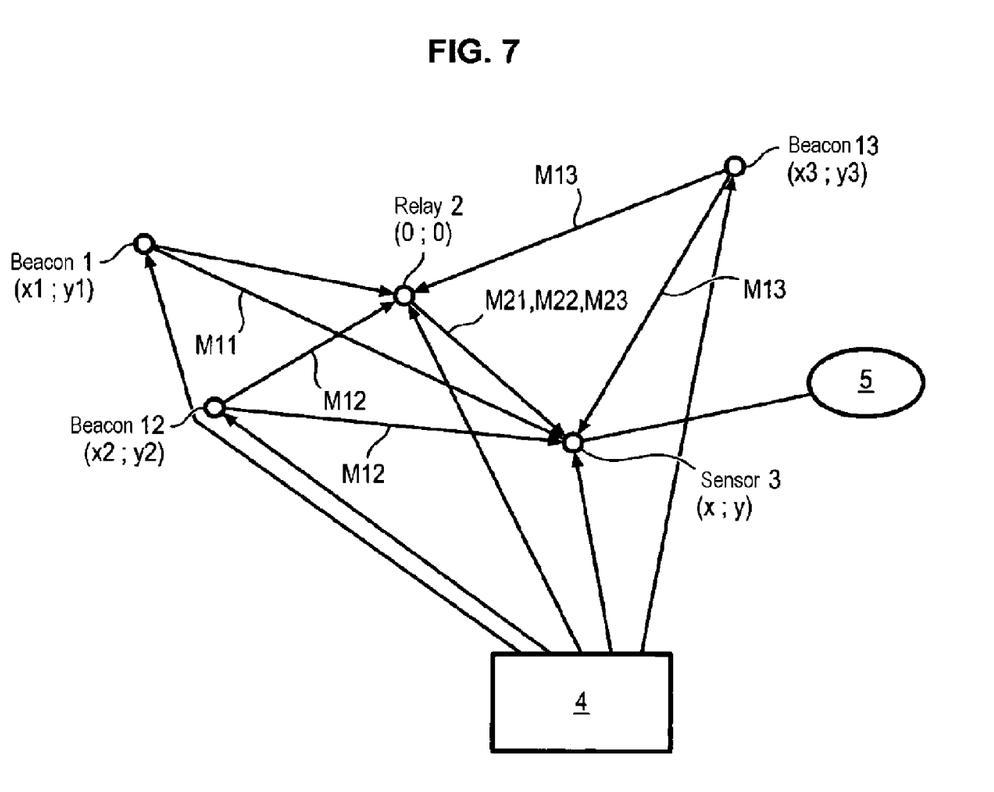
FIG. 7 is a drawing of a third embodiment of the invention having several fixed beacons, a fixed relay and a mobile sensor, synchronized by a central sequencer, especially to ensure time multiplexing.

In the embodiment whereof the diagram is shown in FIG. 6 and the general drawing is illustrated in FIG. 7, a central sequencer 4 is added to the system to avoid collisions between the different messages. This central sequencer 4 has a radio transmitter, which can be other than radio with Ultra-WideBand pulses. Each beacon 11, 12 and 13 also has a radio receiver capable of receiving messages coming from the overall sequencer 4. In the event where there are several relays 21 and 22 within the same system, as explained in FIG. 6, it is proposed to ensure that the messages M21 and M22 do not collide with each other.

For example, a time lag D different to each relay 21 and 22 of the system can be affected statically or dynamically so that, if several relays 21 and 22 receive the same message M11, M12 or M13, each message M21 and M22 can be transmitted in turn. In this case the relay 2, 21, 22 could communicate the time lag D used in the data area of the message M2.

In another implementation of the invention, it can be ensured that a single relay 21 or 22 has its receiver lit at a given time, for example by means of a system of TDMA type such as described earlier. This guarantees that a single message M21 or M22 is transmitted following a message M11, M12 or M13.

In a particular embodiment of the invention, the focus is on the location of a mobile element in a building or an enclosure. For example, the aim is to locate a vehicle or a mobile terminal in a warehouse.

According to this embodiment, the coverage area is equipped of at least one beacon 1 whereof the position is supposedly known and of at least one relay 2 whereof the position is also supposedly known.

With the position of the beacons 1 and the relays 2 being known, the flight time from a beacon 1 to a relay 2 is therefore also supposedly known. For example, the latter can be determined by calculating from the positions of the beacon and of the relay or determined empirically.

The sensor 3 is here linked to a mobile object whereof the position in the building or in an enclosure is to be determined. For example the sensor 3 is integrated into a vehicle or a mobile terminal whereof the position in the building or in the enclosure is to be determined.

The sensor 3 is supposedly within communication reach of the beacons 1 and the relays 2. Several mobile objects all equipped with a sensor 3 can be located in the coverage area, the following description is generalized for each sensor 3 in the system.

As per this embodiment and the general operating principle of the invention, each beacon 1 in turn transmits a radio message M1 containing at least one unique position stamp. The message M1 can further include an identifier for uniquely determining the identity of the beacon 1.

Each message M1 transmitted by a beacon 1 is captured quasi-simultaneously—with a difference in flight time—by a sensor 3, which measures the time t1 of receiving the message M1 in its own time base, and by a relay 2. The relay 2 transmits with a time lag D a second message M2 containing at least one unique position stamp. The message M2 can also contain in a data area a first identifier for uniquely determining the identity of the beacon 1 having transmitted the first message M1 at the origin of the second message M2, and/or a second identifier for uniquely determining the identity of the relay 2 transmitting the second message M2. There can be several relays 2.

Each message M2 is captured by the sensor 3 which determines the time t3 of receiving by its receiver in its local time base. The sensor 3 forms, for each message M1 followed by a message M2 a pair (t1; t3) describing the respective times of arrival of the first message M1 and second message M2 in its local time base. If needed, these pairs can be increased to include the identity of the beacon 1 and/or that of the relay 2, for example in the form of a quadruplet (1; 2; t1; t3).

According to this embodiment of the invention, the mobile can also integrate a position calculation unit 5. The pairs (t1; t3) or the quadruplets (1; 2; t1; t3) are communicated from the sensor 3 to the position calculation unit 5.

For each pair of first messages M1 followed by a second message M2 received by a sensor 3 originating from a beacon 1 via a relay 2, the position calculation unit 5 knows an estimation of the time t1 of arrival of the first message M1 to the sensor 3, an estimation of the time t3 of arrival of the second message M2 to the sensor 3, the position of the beacon 1, the position of the relay 2, an estimation of the flight time of the message M1 from 1 to 2 and an estimation of the time D of response D of the relay 2.

According to this operating mode, measurements t1 and t3 can therefore be connected to two unknowns: d(1, 3) the distance of the beacon 1 from the sensor 3, and d(2, 3) the distance of the relay 2 from the sensor 3. If the measurements associated with several beacons 1 for the same sensor 3 and the same relay 2 are considered, the position calculation unit 5 can determine an estimation of the position of the mobile linked to the sensor 3.

For example and still in general the case shown in FIG. 2 is presented here of the location in the plane of a mobile object linked to an sensor 3 (x; y) whose position is unknown, from three beacons having position 11 (x1; y1), position 12 (x2; y2) and position 13 (x3; y3) and a single relay 2 having position (0; 0) in any orthonormal reference system.

The beacon 11 transmits a message M11 received at a time t11 by the sensor 3 and relayed by the relay 2 in a message M21 and received at a time t13 by the sensor 3. Similarly, the beacon 12 transmits a message M12 received at a time t21 by the sensor 3 and relayed by the relay 2 in a message M22 received by the sensor 3 at a time t23. Finally, the beacon 13 transmits a message M13 received at a time t31 by the sensor 3 and relayed by the relay 2 in a message M23 received by the sensor 3 at a time t33.

For clearer calculations the beacons 11, 12 and 13 respectively will be called B1, B2 and B3 or Bi, with i=1, 2 or 3. The relay 2 will be called R and the sensor marked 3 in FIG. 2 will be called C.

The distance d(Bi, R), for i integer number between 1 and 3, between Bi and R is supposedly known. Similarly, the flight time $T_{BiR}$ between Bi and R is known for example by construction or by empirical measurement. Then:

$$d(Bi,R) = \sqrt{xi^2 + yi^2} = c \cdot T_{BiR}$$

This can be expressed similarly:

$$d(Bi,C) = \sqrt{(x-xi)^2 + (y-yi)^2} = c \cdot T_{BiC}$$

$$d(R,C) = \sqrt{x^2 + y^2} = c \cdot T_{RC}$$

There is:

$$\begin{cases} t13 - t11 = \dfrac{d(B1,R)}{c} + D + \dfrac{d(R,C)}{c} - \dfrac{d(B1,C)}{c} \\ t23 - t21 = \dfrac{d(B2,R)}{c} + D + \dfrac{d(R,C)}{c} - \dfrac{d(B2,C)}{c} \\ t33 - t31 = \dfrac{d(B3,R)}{c} + D + \dfrac{d(R,C)}{c} - \dfrac{d(B3,C)}{c} \end{cases}$$

There is:

$$\begin{cases} \Delta t1 = t13 - t11 - D - T_{B1R} \\ \Delta t2 = t23 - t21 - D - T_{B2R} \\ \Delta t3 = t33 - t31 - D - T_{B3R} \end{cases}$$

Or, after substitution:

$$\begin{cases} \sqrt{(x-x1)^2 + (y-y1)^2} = \sqrt{x^2 + y^2} - c \cdot \Delta t1 \\ \sqrt{(x-x2)^2 + (y-y2)^2} = \sqrt{x^2 + y^2} - c \cdot \Delta t2 \\ \sqrt{(x-x3)^2 + (y-y3)^2} = \sqrt{x^2 + y^2} - c \cdot \Delta t3 \end{cases}$$

By moving to quadratic form and by reorganizing, the following comes:

$$\begin{cases} 0 = c \cdot \Delta t1 - 2\sqrt{x^2+y^2} + \dfrac{x^2+y^2-(x-x1)^2-(y-y1)^2}{c \cdot \Delta t1} \\ 0 = c \cdot \Delta t2 - 2\sqrt{x^2+y^2} + \dfrac{x^2+y^2-(x-x2)^2-(y-y2)^2}{c \cdot \Delta t2} \\ 0 = c \cdot \Delta t3 - 2\sqrt{x^2+y^2} + \dfrac{x^2+y^2-(x-x3)^2-(y-y3)^2}{c \cdot \Delta t3} \end{cases}$$

By proceeding via successive differences, the square root terms can be eliminated:

$$\begin{cases} 0 = c \cdot \Delta t1 - c \cdot \Delta t2 - \dfrac{x \cdot 2 \cdot x2 + y \cdot 2 \cdot y2 - x2^2 - y2^2}{c \cdot \Delta t2} + \\ \qquad \dfrac{x \cdot 2 \cdot x1 + y \cdot 2 \cdot y1 - x1^2 - y1^2}{c \cdot \Delta t1} \\ 0 = c \cdot \Delta t1 - c \cdot \Delta t3 - \dfrac{x \cdot 2 \cdot x3 + y \cdot 2 \cdot y3 - x3^2 - y3^2}{c \cdot \Delta t3} + \\ \qquad \dfrac{x \cdot 2 \cdot x1 + y \cdot 2 \cdot y1 - x1^2 - y1^2}{c \cdot \Delta t1} \end{cases}$$

It happens that (x;y) is a solution of:

$$\begin{bmatrix} 0 \\ 0 \end{bmatrix} = \begin{bmatrix} \left(\dfrac{2x1}{c \cdot \Delta t1} - \dfrac{2x2}{c \cdot \Delta t2}\right) & \left(\dfrac{2y1}{c \cdot \Delta t1} - \dfrac{2y2}{c \cdot \Delta t2}\right) \\ \left(\dfrac{2x1}{c \cdot \Delta t1} - \dfrac{2x3}{c \cdot \Delta t3}\right) & \left(\dfrac{2y1}{c \cdot \Delta t1} - \dfrac{2y3}{c \cdot \Delta t3}\right) \end{bmatrix} \begin{bmatrix} x \\ y \end{bmatrix} +$$

$$\begin{bmatrix} c \cdot \Delta t1 - c \cdot \Delta t2 + \dfrac{x2^2+y2^2}{c \cdot \Delta t2} - \dfrac{x1^2+y1^2}{c \cdot \Delta t1} \\ c \cdot \Delta t1 - c \cdot \Delta t3 + \dfrac{x3^2+y3^2}{c \cdot \Delta t3} - \dfrac{x1^2+y1^2}{c \cdot \Delta t1} \end{bmatrix}$$

A system of equations for a larger number of degrees of liberty or for a larger number of beacons can also be derived similarly.

Similarly, the preceding example can be generalized to the case of retransmission of messages from one or more beacons via several relays.

It is easy to resolve such a system of equations by analytical processes or by more robust digital processes.

In a variant of the present embodiment of the invention the preceding linearisation can for example be replaced by use of a Kalman filter of EKF or UKF type capable of resolving a non-linear equation system.

In another embodiment of the invention, the mobile element is the beacon or an object carrying the beacon.

For example, the focus is on the location of an object, which can be a shop article, able to be other than telephone, in a building or in an enclosure. For example and still in general the aim here is to be located a palette in storage so as to know the location on a plane.

Each object to be located comprises a beacon. For example, the beacon is in the form of an active tag attached to the object of interest. Each beacon 1 periodically transmits out a first message M1. Apart from its radio transmitter with Ultra-WideBand pulses, each beacon therefore comprises a local time base. For example, a beacon 1 can be configured for transmitting a message M1 twice per second.

In this embodiment, apart from the time stamp for precisely determining the time of receiving, the message M1 comprises a data area containing an identifier for uniquely determining the identity of the beacon 1 and information for determining the time t0 of transmitting the message M1 in a local time base to the beacon 1.

The coverage area, for example the storage in the illustration hereinabove, is equipped with at least one relay 2 having a known position. More precisely, as many relays as are necessary are installed to allow each beacon 1 to be within communication reach of at least as many relays as degrees of liberty to be resolved by the location system. For example, in the case of location in the plane it will be ensured that at every position possible a beacon 1 is capable of communicating with at least two relays.

The messages M1 originating from the beacons 1 linked to the objects to be located are transformed into messages M2 by the relay 2 such as described previously. For example, in addition to the time stamp serving to determine the time of arrival, the messages M2 comprise first information for identification of the beacon 1, second information for determining the identity of the relay 2, third information for determining the time t0 of transmitting the first message M1 in the local time base to the beacon 1, and fourth information for determining the time lag D applied by the relay 2 for retransmitting message M1 as message M2.

The coverage area is also equipped with at least one point of supposedly known position access. Each access point comprises at least one sensor 3. More particularly, as many access points or sensor 3 as necessary will be installed so that a beacon 1 may communicate with at least one sensor 3 at any possible position.

More precisely, the position of the relays 2 and sensors 3 is selected such that when a beacon 1 can communicate with a relay 2 and a sensor 3, communication can also be set up between the relay 2 and the sensor 3.

According to this operating mode the flight time of a message M2 from a relay 2 to a sensor 3 is supposedly known. For example, this flight time can be determined in a determinist manner from the distance from the relay 2 to the sensor 3 or empirically.

In this embodiment, the sensors 3 are connected together by any communication means, for example by a computer network of Ethernet or Wi-Fi type.

Still according to this embodiment, the system has at least one position calculation unit 5, for example in the form of a computer server connected to the network of sensors 3.

In keeping with the invention, on successive receiving of a first message M1 and a second associated message M2 each sensor 3 reports the respective times of arrival t1 and t3 of the first message M1 and of the second message M2.

For each pair of message M1 followed by an associated message M2, each sensor 3 transmits a report to the position calculation unit 5. Such a report comprises for example inter alia an identifier for uniquely determining the identity of the sensor 3, information for determining the time t0 of transmitting the message M1 in the local time base of the beacon 1, the respective times of arrival t1 and t3 of messages M1 and M2 to the sensor 3 in its own time base, identification of the beacon 1 having transmitted the first message M1 and that of the relay 2 having transmitted the second message M2 in response to the first message M1 and the time lag D used by the relay 2 for transmitting message M2 following its receiving of message M1.

The position calculation unit 5 collects the different reports transmitted by the sensors 3.

In a possible embodiment, the position of each beacon 1 is determined by means of a Kalman filter of EKF or UKF type linked to the beacon 1. The received reports coming from the sensors 3 are grouped by identifier of beacon 1 and are ordered by increasing time t0. For a given message M1 transmitted to given t0, there are at least one estimation of the time t1 of receiving the first message M1 by a sensor 3 of known identity and position, the identity and the position of a relay 2 having transmitted an associated message M2, the time t3 of receiving the message M2 by the same sensor 3, the retransmission time lag D of the message M2 by 2, the flight time from the relay 2 to the sensor 3.

The Kalman filter can be updated to estimate the position of the beacon 1 at the time t0. In fact, by knowing an estimation $(\hat{x}; \hat{y})_t$ of the position of the beacon 1 at a time t less than t0 and a model of the evolution of this position between t and t0, the Kalman filter could determine the probable position $(\hat{x}; \hat{y})_{t0}$ of the beacon 1 at the time t0 by means of the observation equation:

$$\Delta t = t3 - t1 - D - \frac{d(2;3)}{c} = \frac{d(1;2)}{c} - \frac{d(1;3)}{c}$$

with d(1;2) the Euclidian distance of the beacon 1 from the relay 2, d(1;3) the Euclidian distance of the beacon 1 from the sensor 3, the known time lag D and the known flight time $$\frac{d(2;3)}{c}$$

from the relay 2 to the sensor 3.

In the case of a system which would comprise at least one beacon of supposedly known position and at least one sensor of supposedly known position, the preceding embodiments can be generalized. The system would further comprise one or more relays whereof the position is to be determined, which corresponds to the embodiment where the mobile element is the relay or an object carrying the relay.

According to an embodiment, the format of the Ultra-WideBand pulse radio message M1 or M2 such as presented in FIG. 3 is the following:

synchronization header containing periodic repetitions of a predetermined sequence of present or absent pulses, positive or negative transposed in frequency around a carrier;

packet start stamp represented by a sequence of known pulses (present or absent, positive or negative) transposed in frequency around a carrier, and easily distinguishable from the synchronization header;

data field in the form of a modulated pulse train.

According to an embodiment, the time stamp for identifying the exact transmission and/or time of arrival of a message is the limit between the end of the packet start delimiter and the start of the data field.

According to an embodiment, the synchronization header is formed by periodic repetitions of a prescribed symbol, in turn formed by a prescribed sequence of pulses (whereof for example +1 denotes a positive pulse, 0 denotes the absence of pulse, and −1 denotes a negative pulse). The synchronization header is for example formed by 1024 periodic repetitions of a symbol formed by the following sequence of pulses: −1 0 0 0 0 +1 0 −1 0 +1 +1 +1 0 +1 −1 0 0 0 +1 −1 +1 +1 +1 0 0 −1 +1 0 −1 0 0. The pulses forming the symbols of the synchronization header given previously by way of example being for example transmitted at a ternary rate of 10 to 500 mega-pulses per second, for example 31.25 Mega pulses per second.

The packet start stamp can for example itself be formed by a succession of symbols (for example 8 symbols) of format identical to those of the synchronization header, but able to be present or absent, of normal or reversed polarity. For example, the sequence 0 +1 0 −1 +1 0 0 −1 can be used to form such a packet start stamp (+1 designating a symbol of format identical to those of the synchronization header given previously by way of example, 0 denoting a total absence of pulse for the duration of a symbol, and −1 designating a symbol similar to those used for the synchronization header but the polarity of the pulses of which has been reversed).

The data field can for example be formed by modulation by position of a pulse train in a given time window. For example, if a time window of for example 100 ns to 10 ms, for example 8 μs is associated with each bit of a binary message to be transmitted it can be determined that a bit at 0 will be represented by the presence of a pulse train in the first half of said window, whereas a bit at 1 will be identified by the presence of a pulse train in the second half of said window. Said pulse train can for example be formed by a pseudo-random succession from 1 to 512 pulses, for example 128 pulses, positive or negative, at a rate of 100 Mega pulses per second at 1 Giga pulses per second, for example 500 Mega pulses per second, the pseudo-random sequence being known of the transmitter and of the receiver and reinitialized at each message start.

Figure 8:
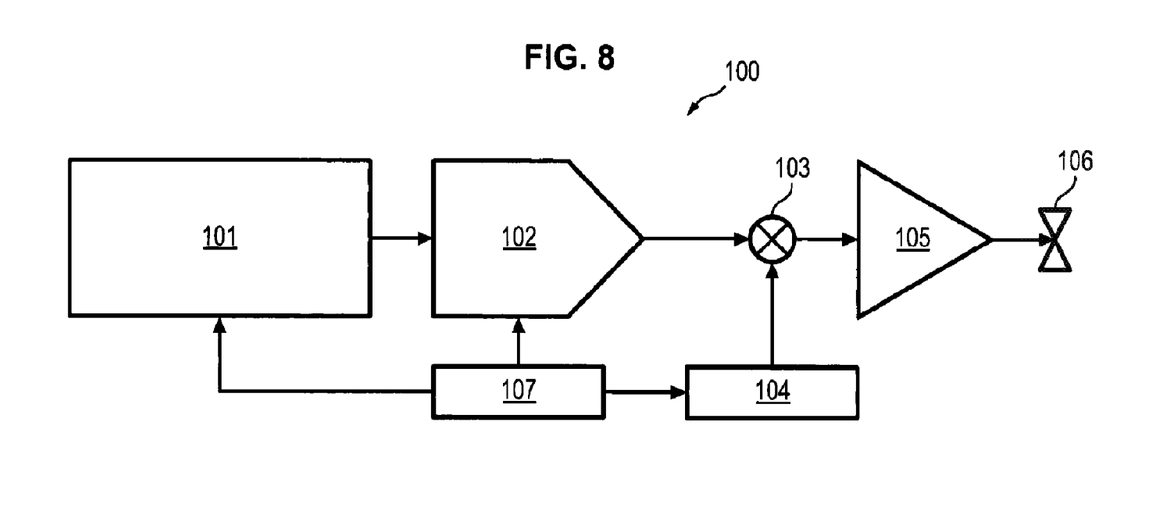
FIG. 8 is a drawing of a transmitter with Ultra-WideBand pulses according to an embodiment of the invention.

According to an embodiment in FIG. 8 an Ultra-WideBand pulse transmitter 100 comprises:
A digital modulator 101 (for example a digital processor) for forming a ternary flow (comprising for example ternary frames);
A digital/analog converter 102 for forming pulses from the ternary flow in a baseband Ultra-WideBand pulse signal;
A mixer 103 for transposition of the baseband Ultra-WideBand pulse signal to an Ultra-WideBand pulse radio-frequency signal;
A local radio-frequency oscillator 104 supplying a central frequency necessary for frequency transposition operation of the mixer 103;
A power amplifier 105 of the Ultra-WideBand pulse radio-frequency signal;
An antenna 106 for radiating the Ultra-WideBand pulse radio-frequency signal (transmission of message M1 or M2),
A first reference clock 107.

This transmitter 100 is for example present in the beacon 1. The transmitter of the relay 2 can comprise elements similar to those of the transmitter 100 of the beacon 1.

The radio-frequency oscillator 104 can be generated from the main reference clock 107 by means of a phase-locking loop. The frequency of the radio-frequency oscillator 104 is for example from 3 to 10 GHz and that of the main reference clock from 100 MHz to 1 GHz, for example 500 MHz.

The rate of the ternary output flow (+1, 0 or −1) of the digital modulator 101 is for example a ternary sample every 500 ps at 2 ns, for example 2 ns, or a rate of 100 Mega ternary samples per second at 2 Giga ternary samples per second, for example 500 Mega ternary samples per second.

The reconstruction filter of the digital/analog converter 102 is for example of lowpass type with a cutoff frequency which can be 400 MHz.

Figure 9:
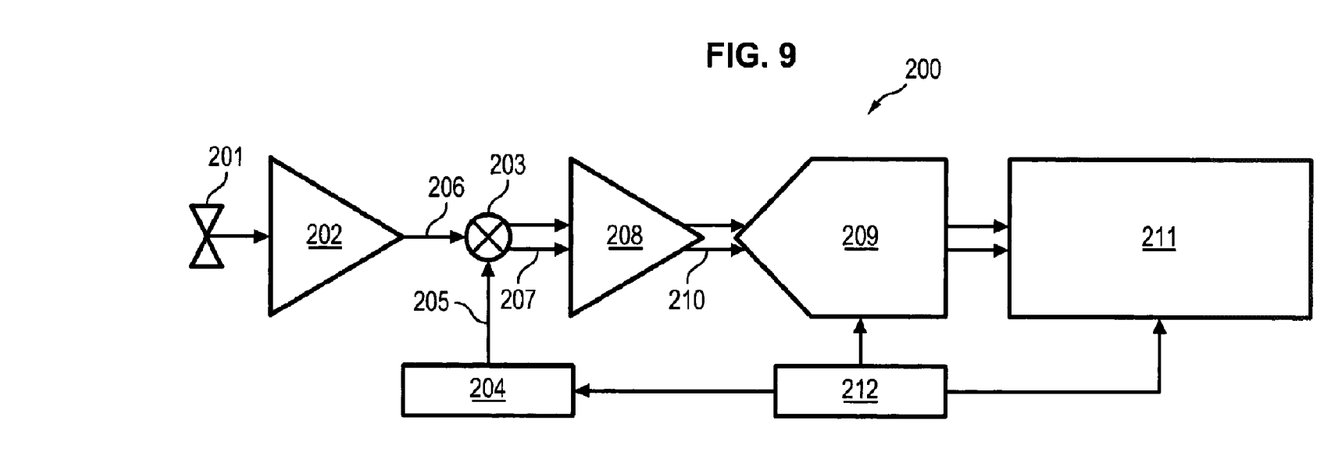
FIG. 9 is a drawing of a receiver with Ultra-WideBand pulses according to an embodiment of the invention.

According to an embodiment, in FIG. 9 an Ultra-WideBand pulse receiver 200 comprises:
An antenna 201 for receiving the Ultra-WideBand pulse radio-frequency signal (reception of the message M1 or M2),
A low-noise amplifier (LNA) 202;
A mixer 203 for transforming the output signal 206 of the amplifier 202 into a baseband signal 207 comprising a phase component and a quadrature component;
A radio-frequency oscillator 204 for supplying the reference signal 205 to the mixer 203;
A baseband amplifier 208 for each of the phase and quadrature components of the output signal 207 of the mixer 203;
An analog/digital converter 209 for each of the phase and quadrature outputs 210 of the baseband amplifier 208;
A digital signal-processing unit 211, comprising for example a digital processor.

According to an embodiment, the analog/digital converter 209 and the digital signal-processing unit 211 function synchronously on a second local reference clock 212.

The radio-frequency oscillator 204 can be created by multiplication from a second clock local reference 212, for example by means of a phase lock loop.

This receiver 200 is for example present in the sensor 3. The receiver of the relay 2 can comprise elements similar to those of the receiver 200.

According to an embodiment, the steps for receiving in the signal digital signal-processing unit 211 comprise:
Frequency synchronization of the clocks of the receiver with those of the transmitter;
Symbol synchronization by correlation with the known sequence of the synchronization header;
Acquisition of a pulse channel response;
Search for the frame start delimiter;
Search for the time stamp for identifying the exact time of arrival of the messages.

According to an embodiment of the invention, the digital processing unit 211 has a permanent counter operating at the rhythm of 1 increment to each cycle of the second local clock reference 212, and the unit 211 captures the value of said counter during receiving of the time stamp present in the messages M1 and M2. The value of this counter is considered as that of the time t1, t2 or t3 in the local time base of the receiver 200. For example, the dynamic of the counter can be 32-bits.

As per a possible embodiment of the invention, the digital processing unit 211 integrates analysis capacities of the pulse channel response by oversampling and interpolation for identifying the time of arrival with a resolution less than that of a sample.

Figure 10:
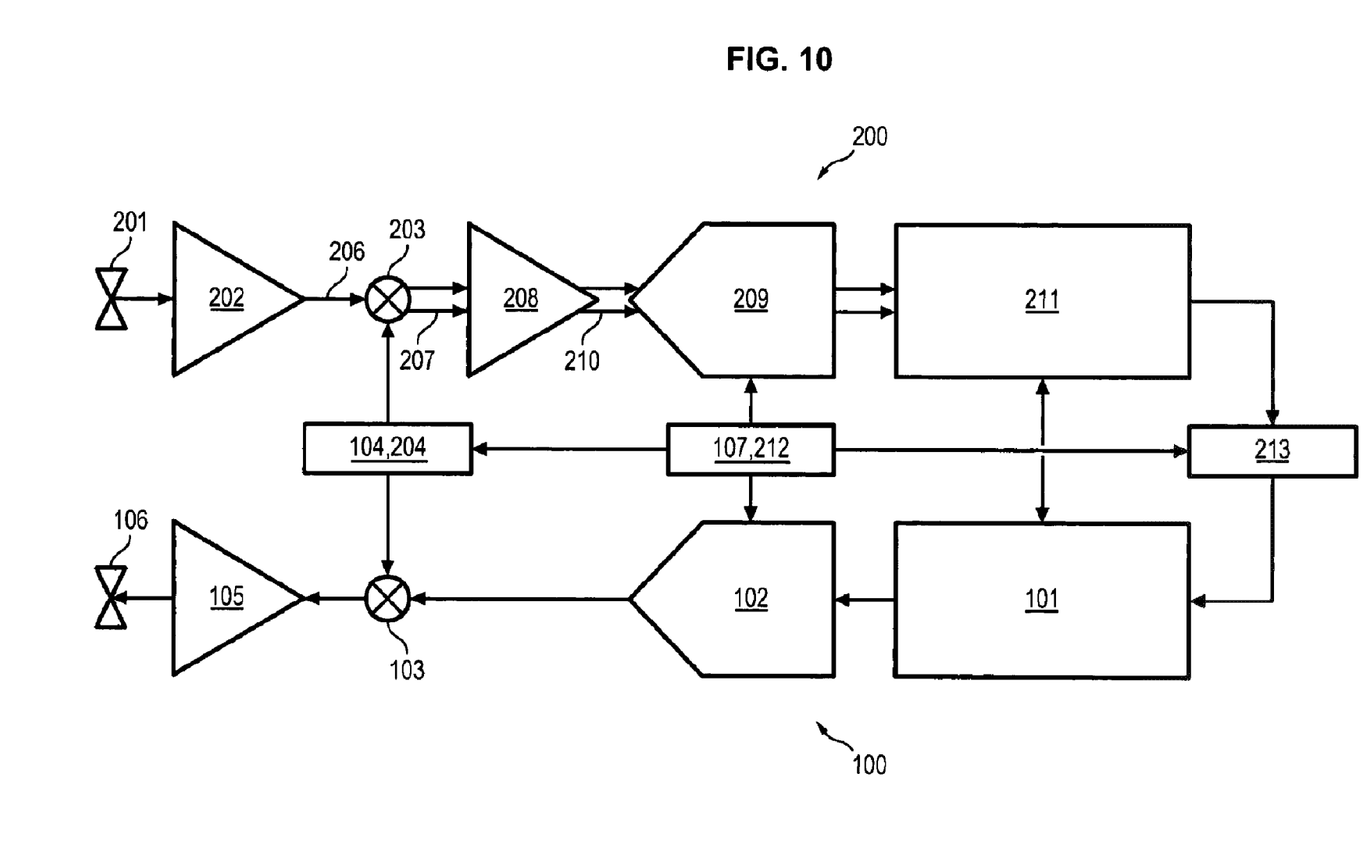
FIG. 10 is a drawing of a transceiver with Ultra-WideBand pulses according to an embodiment of the invention.

The relay 2 implements a receiving chain and a transmitting chain such as described previously, i.e., a transmitter 100 and a receiver 200 such as described previously.

The functionalities of reference clocks 107 and 212 and radio-frequency oscillators 104 and 204 can be pooled or left independent. There can therefore be a single reference clock 107, 212 for the transmitter 100 and the receiver 200 in the relay 2. There can therefore be a single radio-frequency oscillator 104, 204 for the transmitter 100 and the receiver 200 in the relay 2.

A counter 213 and/or a delay line 213 can be provided between the digital signal-processing unit 211 and the digital modulator 101. This counter 213 and/or this delay line 213 serves for example to create the time lag D in the message M2.

The relay 2 can have only a single antenna 106, 201 if it further has a transmitting/receiving antenna switch, or two separate antennas 106 and 201.

The invention claimed is:

1. A system for locating a mobile element inside an enclosure, comprising:
    a beacon configured to transmit a first radio message inside the enclosure;
    a relay configured to transmit a second radio message inside the enclosure with a known time lag following receiving the first radio message coming from the beacon, wherein the known time lag is greater than a maximum flight time of the first radio message from the beacon to the relay;
    a sensor configured to measure, in a local time base, times of arrival of the first and the second radio messages inside the enclosure coming from the beacon and the relay;
    a position computer configured to determine a position of the mobile element, which is the sensor, based at least on positions and time of arrival information known by the position computer, the beacon and the relay;
    wherein the beacon comprises at least one radio transmitter configured to provide first Ultra-WideBand pulses to transmit the first radio message,
    wherein the relay comprises at least one radio receiver configured to process the first Ultra-WideBand pulses to receive the first radio message and a radio transmitter configured to provide second Ultra-WideBand pulses to transmit the second radio message, and
    wherein the sensor comprises at least one radio receiver configured to process the first and the second Ultra-WideBand pulses to receive the first radio message and the second radio message.

2. The system for locating the mobile element inside the enclosure according to claim 1, further comprising a central sequencer having a radio transmitter, wherein the beacon or the relay comprises a radio receiver adapted for receiving messages transmitted by the central sequencer.

3. The system for locating the mobile element inside the enclosure according to claim 1, further comprising a plurality of sensors including the sensor, connected by a telecommunications means to the position computer.

4. The system for locating the mobile element inside the enclosure according to claim 3, wherein the telecommunications means is Ethernet or WI-FI and the position computer is a computer server.

5. The system for locating the mobile element inside the enclosure according to claim 1, wherein the position computer is onboard the sensor.

6. The system for locating the mobile element inside the enclosure according claim 1, wherein the known time lag is known by the position computer, wherein the position computer is configured to determine a position of the mobile element from at least the known time lag.

7. The system for locating the mobile element inside the enclosure according to claim 2, further comprising a second beacon, wherein the central sequencer transmits a first message to the beacon and a second message to the second beacon so that the first radio message from the beacon and a third radio message from the second beacon are transmitted in a time division multiple access (TDMA) manner to avoid a collision.

8. The system for locating the mobile element inside the enclosure according to claim 2, wherein the radio transmitter of the central sequencer is configured to transmit radio signals other than Ultra-WideBand pulses.

9. The system for locating the mobile element inside the enclosure according to claim 1, further comprising a second relay, wherein the second relay comprises a different time lag than the known time lag of the relay.

10. The system for locating the mobile element inside the enclosure according to claim 9, wherein the different time lag is determined dynamically.

11. A method for locating a mobile element inside an enclosure, comprising:
    transmitting, by a beacon, at least one first message inside the enclosure;
    receiving the first message by a relay and transmitting a second message with a known time lag relative to receiving the first message by the relay, wherein the known time lag is greater than a maximum flight time of the first message from the beacon to a sensor;
    receiving the first and the second messages by the sensor;
    measuring by the sensor, in a local time base, times of arrival of the first and the second messages from the beacon and the relay;
    determining by a position computer, a position of the mobile element carrying the the relay, from at least positions and time of arrival information, known by the position computer, of the beacon and the sensor,
    wherein the beacon comprises at least one radio transmitter configured to provide first Ultra-WideBand pulses to transmit the first message,
    wherein the relay comprises at least one radio receiver configured to process the first Ultra-WideBand pulses to receive the first message and a radio transmitter configured to provide second Ultra-WideBand pulses to transmit the second message, and
    wherein the sensor comprises at least one radio receiver configured to process the first and the second Ultra-WideBand pulses to receive the first message and the second message.

12. The method for locating the mobile element inside the enclosure according to claim 11, wherein the first message transmitted comprises a time stamp for identifying a time of transmitting in a time base of the beacon or a time of receiving the first message in a time base of the relay or of the sensor.

13. The method for locating the mobile element inside the enclosure according to claim 12, wherein the first message further comprises a synchronization header that contains periodic repetitions of a prescribed symbol including a prescribed sequence of pulses including present or absent pulses, wherein the present pulses are positive or negative, and wherein the prescribed sequence of pulses are transposed in frequency around a carrier.

14. The method for locating the mobile element inside the enclosure according to claim 13, wherein the first message further comprises a packet start stamp represented by a succession of symbols identical to those of the synchronization header, wherein pulses of a symbol of the succession of symbols are present or absent compared to a corresponding symbol of the synchronization header, and the pulses of the symbol of the succession of symbols that are present are of normal or reverse polarity compared to the corresponding symbol of the synchronization header.

15. The method for locating the mobile element inside the enclosure according to claim 13, wherein the first Ultra-WideBand radio transmitter is further configured to transmit the prescribed sequence of pulses at a ternary rate of 10 to 500 mega-pulses per second.

16. The method for locating the mobile element inside the enclosure according to claim 12, wherein the first message further comprises a data field comprising a pseudo-random sequence of pulses known to the beacon and the relay, wherein the pseudo-random sequence of pulses is reinitialized at a start of transmission of the first message.

17. The method for locating the mobile element inside the enclosure according to claim 11, wherein the second message transmitted by the relay comprises a time stamp identifying: a time of transmitting the second message in a time base of the relay; a time of receiving the second message in a time base of the sensor; or the known time lag between a time of receiving the first message at the relay and the time of transmitting the second message in the time base of the relay.

18. The method for locating the mobile element inside the enclosure according to claim 11, wherein the second message transmitted by the relay comprises an identification of the relay and an identification of the beacon.

19. The method for locating the mobile element inside the enclosure according to claim 11, wherein the known time lag between receiving, by the relay, the first message and transmitting, by the relay, the second message is at least equal to a processing time of the first or second message, and is of the same order of magnitude as the processing time of the first or second message.

* * * * *